United States Patent
Nobuoka (10) Patent No.: US 6,198,504 B1
(45) Date of Patent: Mar. 6, 2001

(54) IMAGE SENSING APPARATUS WITH A MOVING IMAGE MODE AND A STILL IMAGE MODE

(75) Inventor: Kousuke Nobuoka, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/345,512

(22) Filed: Jul. 1, 1999

Related U.S. Application Data (62) Division of application No. 08/802,064, filed on Feb. 19, 1997, now Pat. No. 5,986,698.

(30) Foreign Application Priority Data

Feb. 20, 1996 (JP) .................................................. 8-032508
Feb. 10, 1997 (JP) .................................................. 9-026854

(51) Int. Cl.$^7$ .................................................. H04N 5/228
(52) U.S. Cl. .................................................. 348/208; 348/220
(58) Field of Search .................................................. 348/207, 208, 348/220, 221, 239, 155; 396/52, 55; H04N 5/228

(56) References Cited

U.S. PATENT DOCUMENTS

| | | |
|---|---|---|
| 4,714,963 | 12/1987 | Vogel . |
| 5,051,832 | 9/1991 | Losee et al. . |
| 5,734,933 | 3/1998 | Sekine et al. . |
| 5,809,353 | 9/1998 | Hirano . |
| 5,926,216 * | 7/1999 | Nobuoka ............................. 348/208 |
| 6,046,768 * | 4/2000 | Kaneda et al. ..................... 348/208 |

* cited by examiner

*Primary Examiner*—Tuan Ho
(74) *Attorney, Agent, or Firm*—Morgan & Finnegan LLP (57) ABSTRACT

A moving image mode for sensing a moving image or a still image mode for sensing a still image is designated by a mode designation unit of an image sensing apparatus, and image signals of all pixels of a non-interlace scanning type image sensing device are sequentially read out in one field period. If the moving image mode is designated by the mode designation unit, panning compensation is performed. In the panning compensation, whether panning or tilting is being performed during an image sensing operation or not is judged. If it is judged that panning or tilting is being performed, a control unit controls to prohibit or restrain vibration blur correction. If it is judged that neither panning nor tilting is being performed, vibration blur correction is performed in accordance with performance of the image sensing apparatus. Further, if the still image mode is designated, panning compensation is not performed, and vibration blur correction is performed in accordance with performance of the image sensing apparatus.

24 Claims, 11 Drawing Sheets

| MODE SIGNAL | PANNING / TILTING | K |
|---|---|---|
| 1 | 1 | $k_1 \leq K \leq 1$ $(k_1 > k_0)$ |
| 1 | 0 | |
| 0 | 1 | |
| 0 | 0 | $K = k_0$ |

| MODE SIGNAL | PANNING / TILTING | VARIABLES |
|---|---|---|
| 1 | 1 | CUT-OFF FREQUENCY = $f_1$ ($f_1 < f_0$)<br>TIME CONSTANT = $t_1$ ($t_1 > t_0$) |
| 1 | 0 | |
| 0 | 1 | |
| 0 | 0 | CUT-OFF FREQUENCY = $f_0$<br>TIME CONSTANT = $t_0$ |

IMAGE SENSING APPARATUS WITH A MOVING IMAGE MODE AND A STILL IMAGE MODE

This application is a divisional of application Ser. No. 08/802,064, filed Feb. 19, 1997, now U.S. Pat. No. 5,986,698.

BACKGROUND OF THE INVENTION

The present invention relates to an image sensing apparatus utilizing a non-addition scanning type solid-state image sensing device.

Most of image sensing devices, such as a CCD, used in a domestic-use video camera, are composed of a great many number of photoelectric converters (pixels) arranged in two dimensions and a mechanism for sequentially transferring electric charges generated in the photoelectric converters. Upon transferring the electric charges, electric charges generated in the photoelectric converters in every other horizontal line are read out. Therefore, image signals of a half of the pixels in the image sensing device are outputted as image signals of each field in order to improve temporal scalability. As for an image sensing device whose surface is covered with a complementary color mosaic filter, electrical charges of pixels in two horizontal adjacent lines are added and read out upon transferring electric charges generated by the photoelectric converters (referred as "pixel addition scanning type", hereinafter), thereby improving temporal scalability as well as sensitivity.

The image signals obtained from the image sensing device as described above are interlaced signals, and a conventional domestic-use image sensing apparatus applies color processes, such as color reproduction, on the image signals from the image sensing device to generate video signals which conform to television standard, such as NTSC and PAL.

Further, a variety of automatic functions are provided to conventional domestic-use video cameras. Among those functions, there is a vibration blur correction function, which corrects blurs in an image due to vibration of the image sensing device when sensing the image, as a newly provided function. As for methods for correcting vibration blurs, they are roughly classified into two types: one is an electronic method which detects overall movement in a sensed image and controls an image output so as to cancel out the movement; and the other is an optical method which detects overall movement of a video camera by using an angular velocity sensor or an acceleration sensor, such as a gyro sensor, and controls a variable apical angle prism provided in an optical system in accordance with the detected result. In either method, processes are performed so as to achieve stable vibration blur correction in various situations for sensing a moving image. Panning compensation is one of the vibration blur correction methods. In this method, whether a detected movement is due to vibration of the camera or due to an intentional movement of the camera, such as panning and tilting, by an operator is determined. On the basis of the determination, the magnitude of vibration blur correction is changed. Thereby, vibration blurs are corrected as much as possible.

Meanwhile, there is a proposal to conventionally output image signals generated by a two dimensional image sensing device, as a moving image, to a television monitor of television standard, such as NTSC and PAL, as well as output the image signals to an information processing device, such as a computer and a printer, as a still image.

However, image signals which are generated in the conventional manner as described above do not have good vertical resolution since it is sacrificed for improving temporal scalability. Therefore, the quality of such images is inferiors to the quality of an image inputted by a stable image input device, such as a scanner.

If an image of an even-line field and an image of a successive odd-line field are combined together to make a frame image in order to avoid the aforesaid problem, when an object is moving, the combined frame image would not be a still image of high quality since the object looks differently when sensing an image of the even-line field and when sensing an image of the odd-line field. Further, in pixel addition scanning type image sensing device, image signals of a field are obtained by adding electric charges of pixels in two horizontal adjacent lines, vertical resolution is also deteriorated. Accordingly, the vertical resolution of a frame image does not improve by combining an image of an odd-line field and an image of a successive even-line field.

Accordingly, the first problem of an image sensing apparatus using the conventional image sensing device is that it is difficult to generate both video signals of various kinds of television standards and signals for a still image output medium.

Further, in a case of sensing a still image as described above, since the sensitivity and the dynamic range of the solid-state image sensing device are much lower and narrower than those of a silver halide film, the shutter speed of the image sensing device is necessarily set slower than that when using a silver halide film under the same image sensing conditions. Therefore, a high-performance vibration blur correction system is highly required for sensing a still image. However, when panning compensation for sensing a moving image is set to a vibration blur correction system, the performance of the vibration blur correction system is somewhat sacrificed, which results in an unsatisfactory vibration blur correction for a still image.

Accordingly, the second problem of the conventional technique is that satisfactory vibration blur correction function for sensing both a moving image and a still image has not been developed.

SUMMARY OF THE INVENTION

The present invention has been made in consideration of the aforesaid situation, and has as its object to provide an image sensing apparatus capable of generating video signals of various kinds of formats and image signals conforming to still image output media, as well as having a satisfactory vibration blur correction function.

According to the present invention, the foregoing object is attained by providing an image sensing apparatus comprising: an image sensing device which sequentially outputs non-interlaced image signals of all pixels; mode designation means for designating either a moving image mode in which image signals for a moving image are generated from the non-interlaced image signals or a still image mode in which image signals for a still image are generated from the non-interlaced image signals; correction means for performing vibration blur correction; control means for prohibiting or restraining the vibration blur correction to be performed by the correction means in a case where the image sensing apparatus is making a predetermined movement; and switching means for disabling the control means in a case where the still image mode is designated by the mode designation means.

The foregoing object is also attained by providing an image sensing apparatus comprising: an image sensing device which sequentially outputs non-interlaced image signals of all pixels; mode designation means for designating either a moving image mode in which image signals for a moving image are generated from the non-interlaced image signals or a still image mode in which image signals for a still image are generated from the non-interlaced image signals; judging means for judging whether or not the image sensing apparatus is making a predetermined movement while sensing an image by the image sensing device; correction means for performing vibration blur correction whose correction degree can be changed; and setting means for setting the correction degree of the vibration blur correction to be performed by the correction means on the basis of the mode designated by the mode designation means and a judged result by the judging means.

Further, the foregoing object is also achieved by a control method comprising: an image sensing step of sequentially outputting non-interlaced image signals of all pixels of an image sensing device; a mode designation step of designating either a moving image mode in which image signals for a moving image are generated from the non-interlaced image signals or a still image mode in which image signals for a still image are generated from the non-interlaced image signals; a correction step of performing vibration blur correction; a control step of prohibiting or restraining the vibration blur correction to be performed at the correction step in a case where the image sensing apparatus is making a predetermined movement; and a switching step of prohibiting the control step in a case where the still image mode is designated at the mode designation step.

Furthermore, the foregoing object is also achieved by an control method comprising: an image sensing step of sequentially outputting non-interlaced image signals of all pixels of an image sensing device; a mode designation step of designating either a moving image mode in which image signals for a moving image are generated from the non-interlaced image signals or a still image mode in which image signals for a still image are generated from the non-interlaced image signals; a judging step of judging whether or not the image sensing apparatus is making a predetermined movement while sensing an image at the image sensing step; a setting step of setting correction degree of vibration blur correction on the basis of the mode designated at the mode designation step and a judged result obtained at the judging step; and a correction step of performing vibration blur correction on the basis of the correction degree set at set setting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First, embodiments of the present invention will be briefly described.

An image sensing device, called an all-pixel (progressive or non-interlace) scanning type CCD, which reads out charges without adding charges of pixels in two horizontal adjacent lines has been developed. The vertical resolution of an image obtained by such a non-interlace scanning type image sensing device is twice the vertical resolution of an image obtained by a pixel addition scanning type or an interlace scanning type image sensing device if the numbers of pixels of these image sensing devices are same. Therefore, the resolution of an image obtained by the non-interlace scanning type image sensing device is greatly improved comparing to the conventional pixel addition scanning type or an interlace scanning type image sensing device. Further, since the non-interlace scanning type CCD can read image signals of one whole frame without adding charges of pixels in two horizontal adjacent lines in the same time period as that required for reading image signals of one field (one field period) by a conventional pixel addition scanning type or an interlace scanning type image sensing device, it is possible for the non-interlace scanning type CCD to obtain a still image without notches on the edges, which would occur if two field images sensed at different time are used to compose one field image, even when sensing a moving object.

According to the present invention, in order to overcome the aforesaid conventional first problem, a non-interlace scanning type CCD is used as an area sensor. When generating video signals for a variety of television standards from frame image obtained in each frame period, image signals of pixels in every other line (e.g., odd lines) are abandoned or image signals of pixels in two horizontal adjacent lines are added to obtain a field image, and in the next frame, image signals of pixels on every other line which have been used in the previous frame (e.g., even lines) are abandoned or image signals of pixels in different two horizontal adjacent lines are added to obtain the next field image. Thereafter, predetermined processes are applied to field images which are sequentially generated as above, and the processed image signals, i.e., video signals of a television standard, are outputted. The above operation is performed under a first mode (moving image mode).

Next, when generating a still image, all image signals of a frame image outputted by the non-interlace scanning type CCD are processed and outputted, thereby obtaining a still image of high quality, keeping the vertical resolution of the non-interlace scanning type CCD at 100%. The above operation is performed under a second mode (still image mode).

Of the above two modes, a suitable one is selected. In other words, when performing a normal moving image sensing operation, the image sensing apparatus is set to the first mode, whereas, when the operator wants to sense a still image, the image sensing apparatus is set to the second mode in accordance with an external control. Accordingly, it is possible for the image sensing apparatus to provide various kinds of television standard video signals as well as provide a still image of high resolution to still image processing media.

Further, in order to overcome the second problem, when the first mode is set, a moving image is sensed while activating the panning compensation for correcting vibration blurs, and when the second mode is set, the panning compensation is inactivated so that vibration blur correction is performed greater than when the first mode is set.

Further, if a system for vibration blur correction includes a variable apical angle prism (referred as "VAP", hereinafter) which is provided vertically with respect to the optical axis of an optical system of an image sensing apparatus and corrects vibration blurs optically, and if a still image is to be sensed in the second mode, the still image is sensed only when the apical angle of the prism becomes smaller than a predetermined value. By controlling the image sensing apparatus as above, effects of chromatic aberration of the VAP, caused because different wavelengths of light have different indexes of refraction, can be eliminated, thereby obtaining a high-quality still image whose color is not separated by the VAP.

First Embodiment

Figure 1:
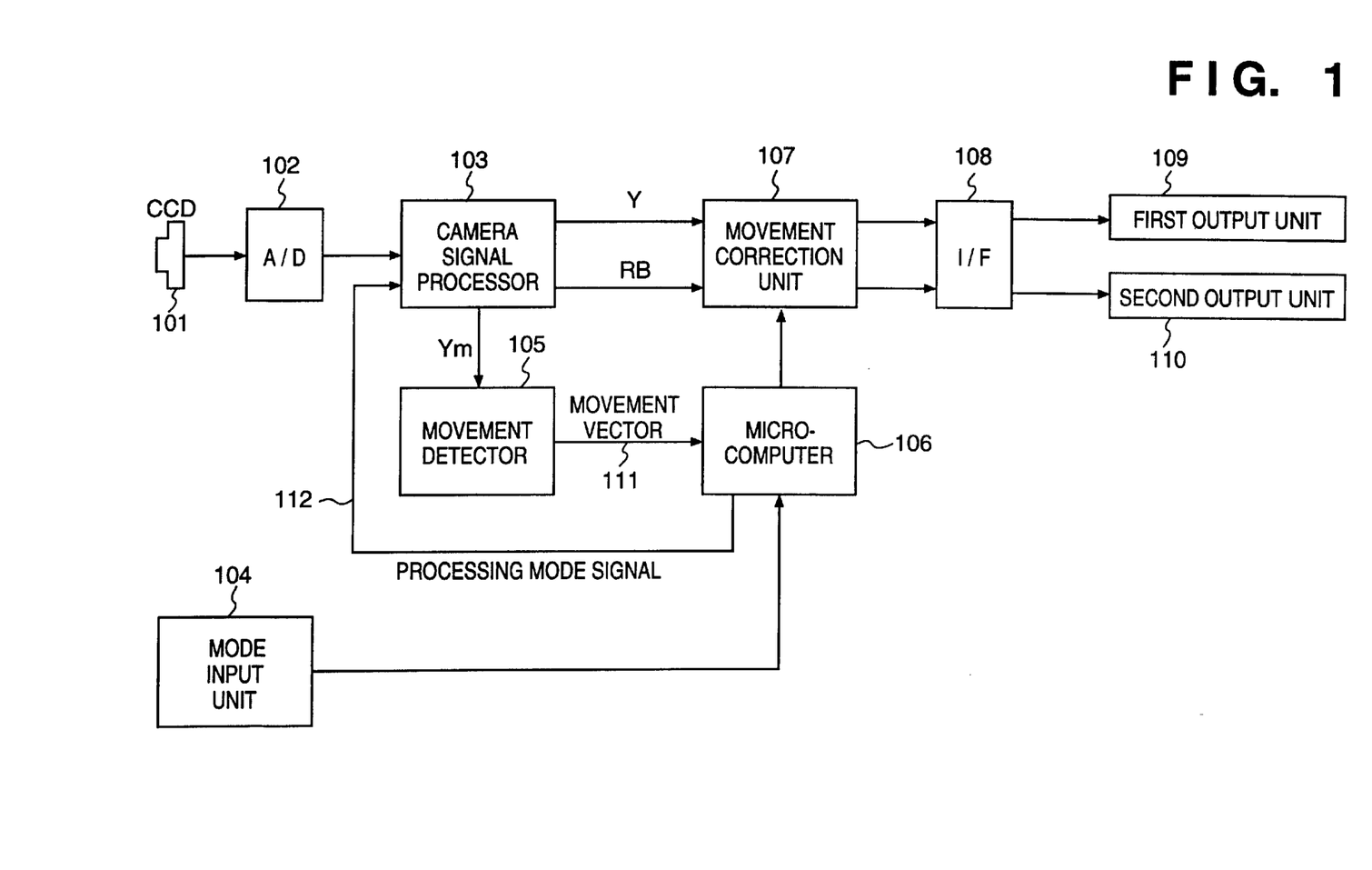
FIG. 1 is a block diagram illustrating a configuration of an image sensing apparatus according to a first embodiment of the present invention.

FIG. 1 is a block diagram illustrating a configuration of an image sensing apparatus according to a first embodiment of the present invention. In FIG. 1, reference numeral 101 denotes a non-interlace scanning type CCD; 102, an analog-digital (A/D) converter; 103, a camera signal processor; 104, a mode input unit; 105, a movement detector; 106, a microcomputer; 107, a movement correction unit; 108, an interface (I/F); 109, a first output unit; 110, a second output unit; Y, a luminance signal; RB, a color difference signal; Ym, a luminance signal for movement detection; 111, a movement vector; and 112, a processing mode signal generated by the microcomputer 106. Note, the camera signal processor 103 will be explained later in detail with reference to FIG. 2, and a panning compensation performed by the microcomputer 106 will be explained later in detail with reference to FIG. 4.

Next, an operation of the first embodiment of the present invention will be explained. All image signals are read out from the non-interlace scanning type CCD 101 at the rate of 60 frame/sec which is two times higher than a rate of reading frame images from a conventional CCD used for generating video signals of NTSC standard, for example. Then, the image signals are converted into digital image signals by the A/D converter 102, and inputted to the camera signal processor 103. Whether to sense a moving image or a still image is set by an operator externally by using the mode input unit 104. The set image sensing mode is inputted to the microcomputer 106, and if it indicates the moving image mode (first mode), the processing mode signal 112 is Low, whereas if it indicates the still image mode (second mode), the processing mode signal 112 is High. The camera signal processor 103 processes the input image signals obtained from the CCD in accordance with the mode designated by the processing mode signal 112, and generates the luminance signal Y and the color difference signal RB.

Further, the camera signal processor 103 generates the luminance signal Ym for movement detection constantly regardless of the mode designated by the processing mode signal 112. The movement detector 105 generates the movement vector 111 by using the luminance signal Ym. The microcomputer 106 generates data used for correcting movement by using the movement vector 111. This operation of the microcomputer will be explained in detail later with reference to FIG. 3. The movement correction unit 107 reads out the luminance signal Y and the color difference signal RB from a memory in such a manner that the movement appears in the luminance signal Y and the color difference signal RB, caused by vibration of the image sensing apparatus, is canceled out, and outputs these signals to the I/F 108. The I/F 108 converts the luminance signal Y and the color difference signal RB, which have been corrected as above, to either video signals of NTSC standard or signals of a data format for still image processing media in accordance with the mode designated by processing mode signal 112. In the moving image mode, NTSC standard video signals are outputted from the first output unit 109, whereas in the still image mode, signals of a data format conforming to still image processing media are outputted from the second output unit 110.

Figure 2:
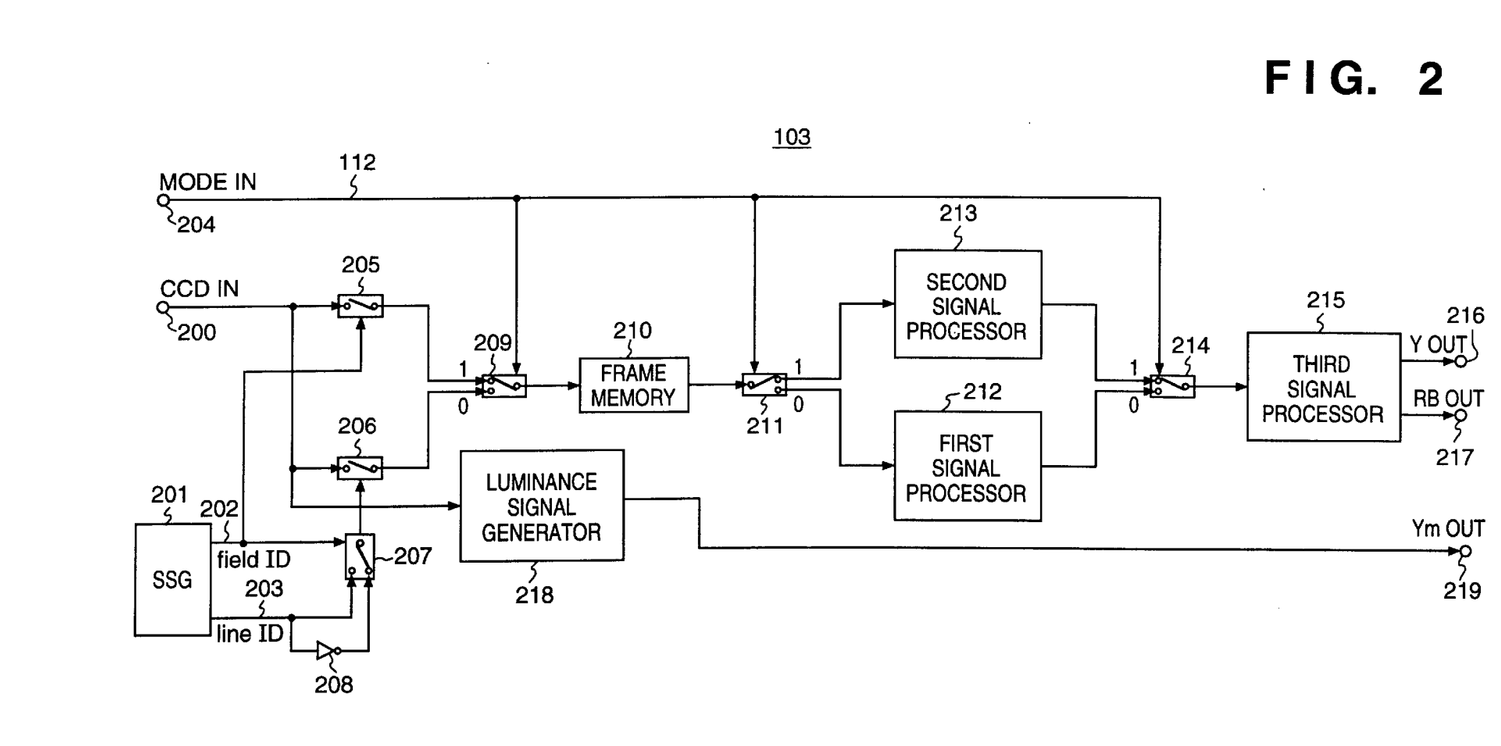
FIG. 2 is a block diagram illustrating a configuration of a camera signal processor shown in FIG. 1.

Next, the camera signal processor 103 shown in FIG. 1 will be explained in detail with reference to FIG. 2. In FIG. 2, reference numeral 200 denotes an input terminal for image signals from the CCD (CCD IN); 201, a synchronizing signal generator (SSG); 202, a field ID signal; 203, a line ID signal; 204, an input terminal for the processing mode signal 112; 205, a first gate; 206, a second gate; 207, a first switch; 208, an inverter; 209, a second switch; 210, a frame memory; 211, a third switch; 212, a first signal processor; 213, a second signal processor; 214, a fourth switch; 215, a third signal processor; 216, an output terminal of the luminance signal Y; 217, an output terminal of the color difference signal RB; 218, a luminance signal generator for movement detection; and 219, an output terminal of the luminance signal Ym for movement detection.

Figure 3:
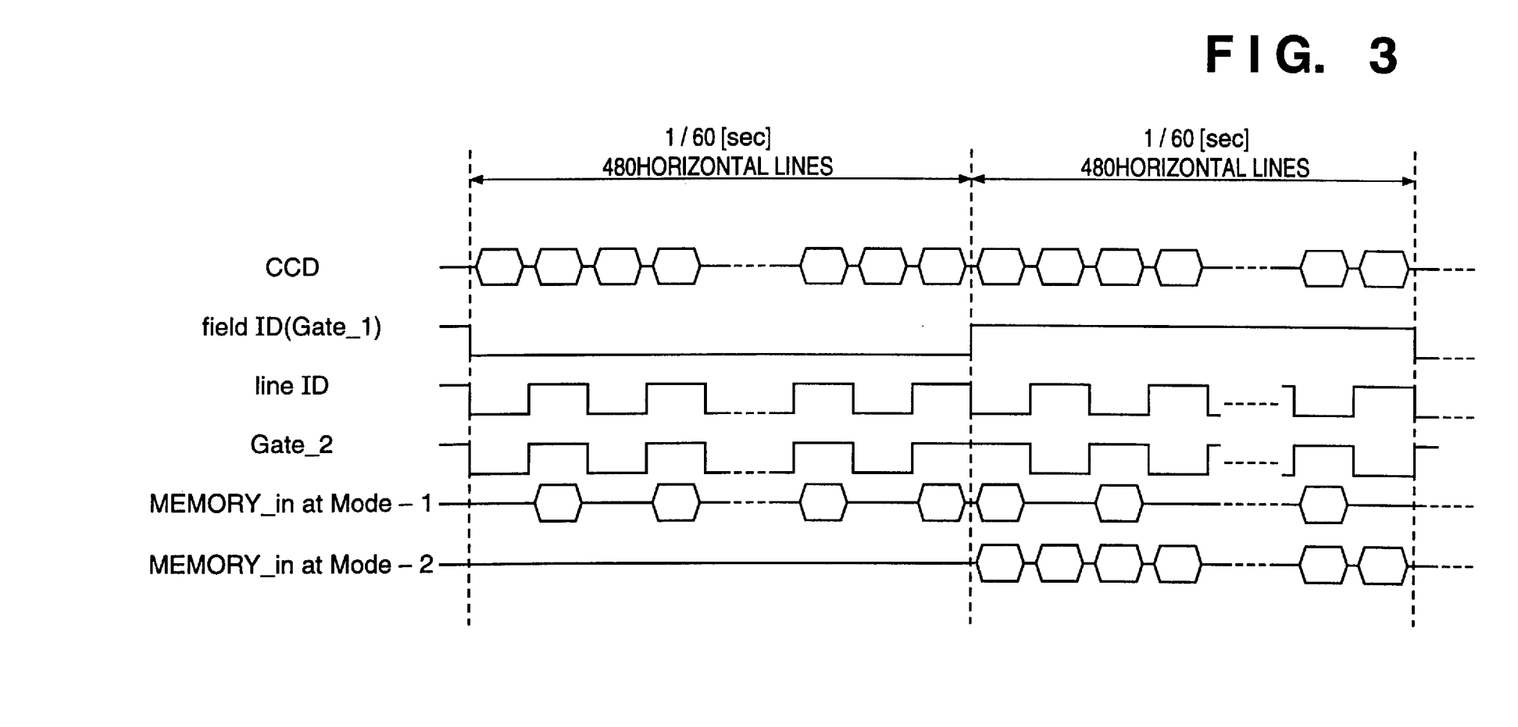
FIG. 3 is a timing chart showing an operation according to the first embodiment of the present invention.

Next, an operation of the camera signal processor 103 will be explained. When sensing in the moving image mode, the processing mode signal 112 inputted via the input terminal 204 is Low as explained with reference to FIG. 1. Therefore, the second to fourth switches 209, 211 and 214 connect to the side 0. The SSG 201 outputs the field ID signal 202 and the line ID signal 203 which are shown in the time chart in FIG. 3. As shown in FIG. 3, the field ID signal 202 switches 0→1→0→1 ... every ⅟60 second, and the line ID signal 203 switches 0→1→0→1 ... every line. Accordingly, the second gate 206 which operates in accordance with the field ID signal 202 and the line ID signal 203 operates as Gate_2 shown in the time chart in FIG. 3, and outputs a signal to a zero-side input terminal for the second switch 209. Therefore, the output from the non-interlace type CCD 101 to the frame memory 210 is as shown by MEMORY_in at Mode-1 in the time chart in FIG. 3. More specifically, in the first frame, signals of even lines of the CCD 101 are written to the frame memory 210, and in the next frame, signals of odd lines of the CCD 101 are written to the frame memory 210. The frame memory 210 stores the image signals of even lines and the image signals of odd lines of one frame alternatively by line as in the order of the scan lines in the CCD 101. Therefore, by reading the image signals stored in the frame memory 210 every other line, interlaced image signals can be obtained in the rate of 60 field/sec.

In a case of sensing an image in the still image mode, the processing mode signal 112 is High. Accordingly, the second to fourth switches 209, 211, and 214 connect to the side 1. Since the first gate 205 is controlled by the field ID signal 202 as shown in FIG. 2 (Gate_1 in FIG. 3), in the first frame, the signals outputted from the CCD 101 are not written to the frame memory 210, and all the output signals from the CCD 101 are written to the frame memory 210 in the next frame (MEMORY_in at Mode-2 in FIG. 3). Therefore, by outputting all the signals from the CCD which are written in the frame memory 210 sequentially, non-interlaced signals are obtained.

In the moving image mode, the image signals from the CCD 101 stored in the frame memory 210 are sent to the first signal processor 212, and in the still image mode, the image signals stored in the frame memory 210 are sent to the second signal processor 213. This is because processes which have to be performed in consideration of correlated distance in the vertical direction, such as color separation and vertical edge correction, have to be performed differently in the moving image mode and in the still image mode, since the correlated distances differ between these modes. Thereafter, processes, such as γ correction, white balance correction, and clamping, which can be performed in common for the first mode and the second mode are performed in the third signal processor 215. Then, the luminance signal Y is outputted from the output terminal 216 and the color difference signal RB is outputted from the output terminal 217. The luminance signal generator 218 for movement detection extracts signals in the predetermined frequency band from signals outputted from the CCD in the rate of 60 frame/sec, and outputs the luminance signal Ym for movement detection from the output terminal 219. Thereby the luminance signal Ym for movement detection can be extracted in the same manner regardless of the image sensing modes.

Figure 4:
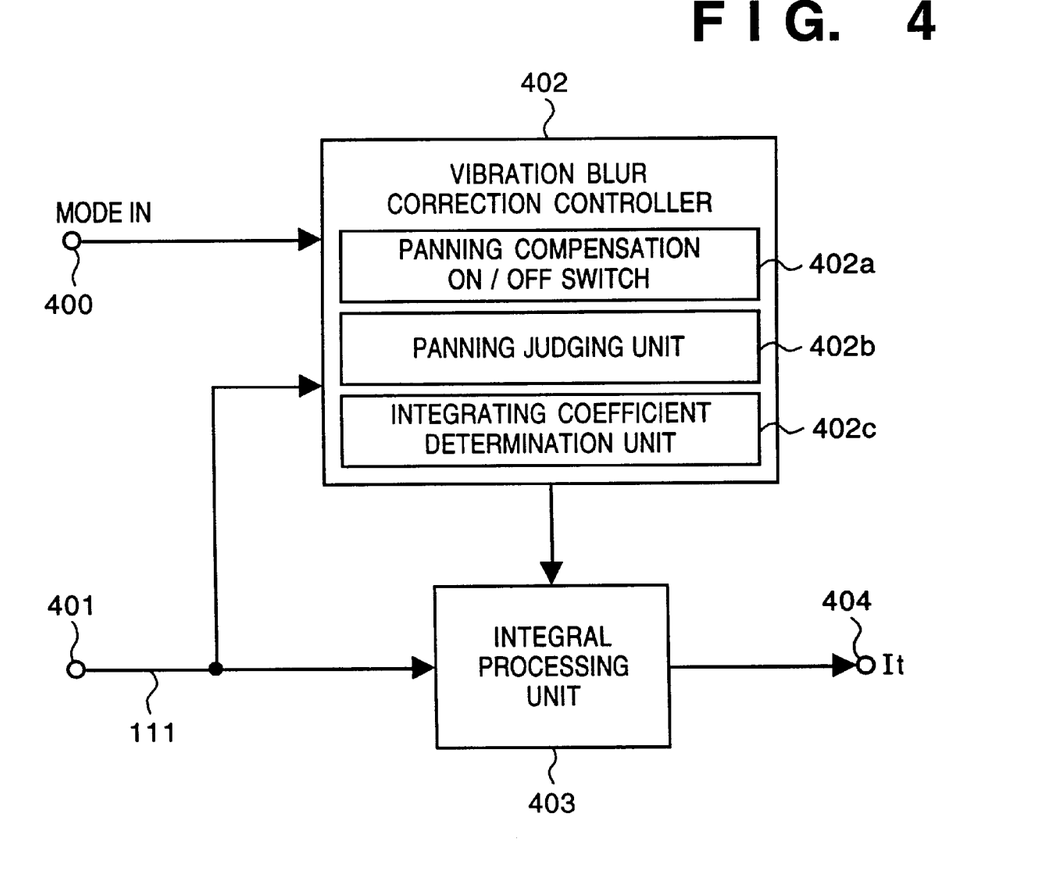
FIG. 4 is a block diagram illustrating a configuration of a microcomputer shown in FIG. 1.
Figure 8:
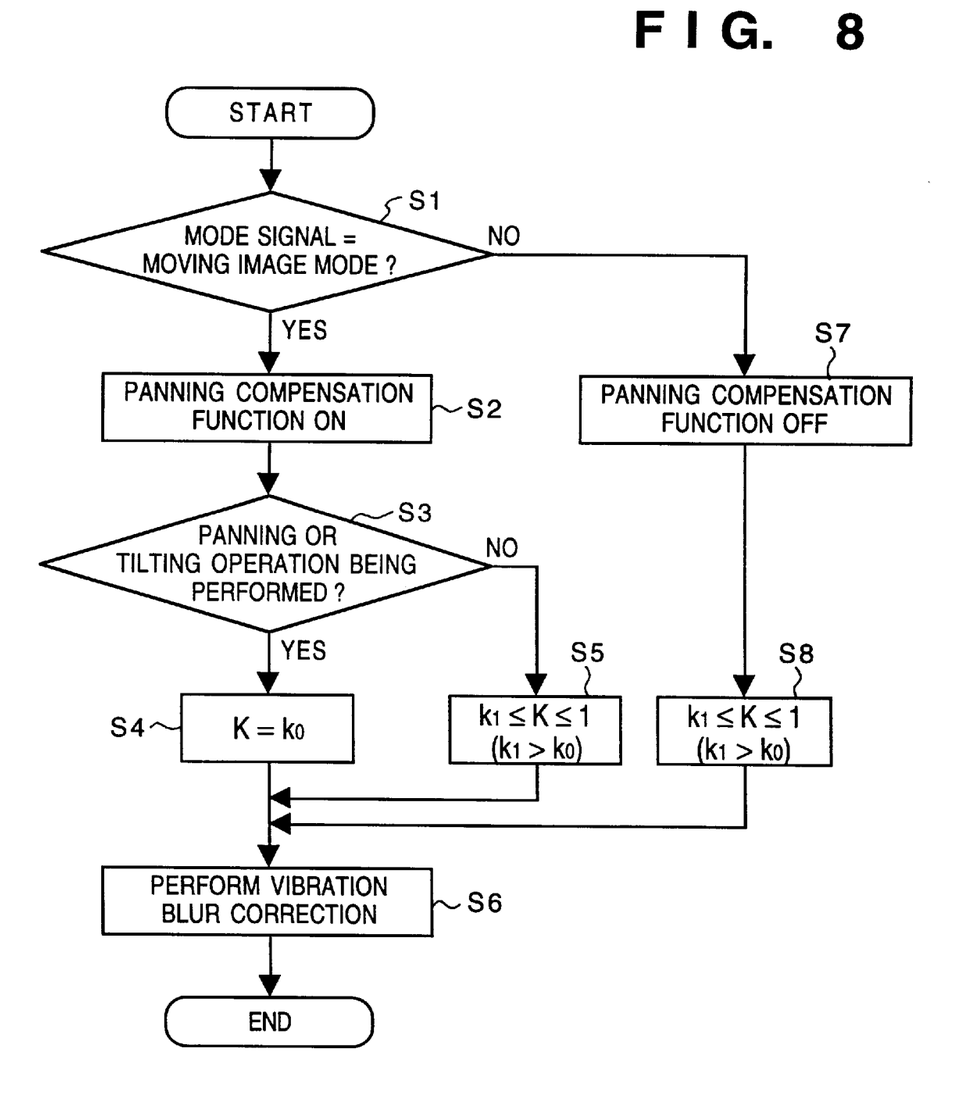
FIG. 8 is a flowchart showing a processing sequence performed by the microcomputer shown in FIG. 4 according to the first embodiment of the present invention.

Next, an operational sequence of panning compensation performed by the microcomputer 106, shown in FIG. 1, when the moving image mode is set and vibration blur correction performed by the microcomputer 106 when the still image mode is set will be explained with reference to FIG. 4 and FIG. 8. In FIG. 4, reference numeral 400 denotes an input terminal for a mode signal from the mode input unit 104 in FIG. 1; 401, an input terminal for the movement vector 111 from the movement detector 105; 402, a vibration blur correction controller; 402a, a panning compensation ON/OFF switch; 402b, a panning judging unit; 402c, an integrating coefficient determination unit; 403, an integral processing unit; and 404, an output terminal of a movement position information $I_t$. The movement vector 111 inputted via the input terminal 401 enters the panning judging unit 402a of the vibration blur correction controller 402 and the integral processing unit 403. The integral processing unit 403 obtains the movement position information $I_t$ by integrating the movement vector 111 in accordance with the following equation.

$$I_t = K \times I_{t-1} + V_t \quad (1)$$

$I_t$: movement position information $I_{t-1}$: movement position information of the previous frame $V_t$: movement vector K: variable coefficient (0~1)

Here, if the coefficient K=1, then the integrated resultant of highest value is outputted as correct position information $I_t$, therefore, vibration blurs are completely corrected, theoretically. On the contrary, if K=0, then integration is not performed, and the position information $I_t$, which is much smaller value comparing to the case of K=1, is outputted. As a result, vibration blurs are scarcely or not corrected.

In the vibration blur correction controller 402, if the mode signal is the moving image mode (YES at step S1 in FIG. 8), then the panning compensation ON/OFF switch 402a is turned ON to perform panning compensation (step S2). First, the panning judging unit 402b judges whether a movement of an image is due to an intentional movement of a camera by an operator, such as panning and tilting, or not on the basis of the movement vector 111. If it is (YES at step S3), the integrating coefficient determination unit 402c sets the coefficient K to 0 or a value near 0 ($k_0$) (step S4), thereby the effect of the vibration blur correction is controlled to be low. If the panning judging unit 402b judges that the movement is not due to an intentional movement of camera (NO at step S3), K is set to an appropriate value between $k_1$ ($k_1 > k_0$) and 1 depending upon the performance of the image sensing apparatus (step S5).

Further, if the mode signal indicates the still image mode (NO at step S1), then the panning compensation ON/OFF switch 402a is turned OFF (step S7). Thereafter, K is set to an appropriate value between $k_1$ ($k_1 > k_0$) and 1 depending upon the performance of the image sensing apparatus (step S8) without performing panning compensation. Accordingly, in the still image mode, the effective vibration blur correction is always performed.

It should be noted that the panning judging unit 402b judges that a movement in an image is due to panning and tilting movement of a camera in a case where the magnitude and direction of the movement vector 111 are substantially constant for a predetermined period of time.

Modification of the First Embodiment

Next, an modification of the first embodiment will be explained.

In this modification, an operational sequence performed by the microcomputer 106 differs from that explained in the first embodiment. In this modification, the vibration blur correction controller 402 does not include the panning compensation ON/OFF switch 402a in FIG. 4. Other units in this modification are the same as those in the first embodiment, thus explanation of those are omitted.

First, to the panning judging unit 402b of the vibration blur correction controller 402, a mode signal is inputted from the input terminal 400 and the movement vector 111 is inputted from the input terminal 401. The panning judging unit 402b judges whether the movement of an image is due to an intentional movement of a camera by an operator (logical value 0 in FIG. 9), such as a panning and tilting, or not (logical value 1 in FIG. 9), on the basis of the movement vector 111 regardless of which of the moving image mode and the still image mode the mode signal indicates.

Figure 9:
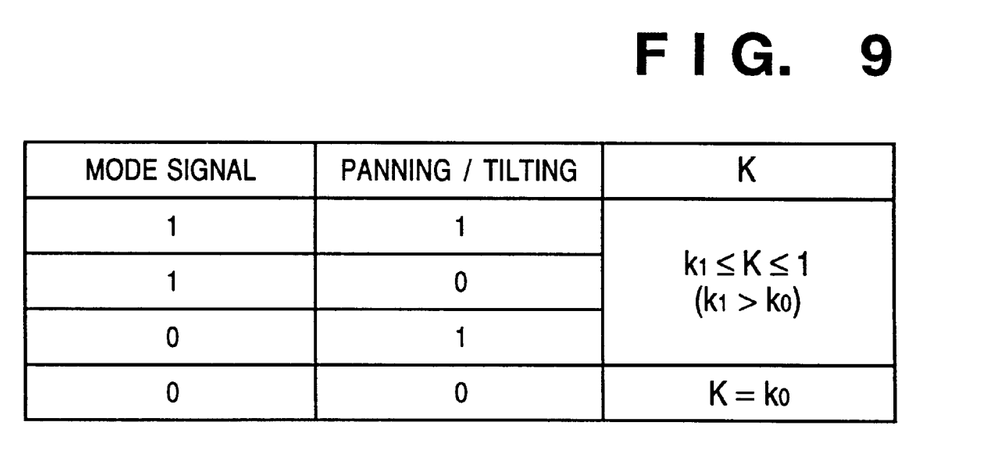
FIG. 9 is a table for explaining a part of operation performed by the microcomputer shown in FIG. 4 according to a modification of the first embodiment.

Next, on the basis of the mode signal and the judged result by the panning judging unit 402b based on the movement vector 111, the value of the coefficient K to be used in the aforesaid equation (1) is determined as shown in FIG. 9. If the mode signal indicates the moving image mode (logical value 0 in FIG. 9) and if the judged result is 0, K is set to 0 or a value near 0 ($k_0$), thereby the effect of the vibration blur correction is controlled to be low. If the mode signal indicates the moving image mode (logical value 0) and if the judged result is 1, K is set to an appropriate value between $k_1$ ($k_1 > k_0$) and 1 depending upon the performance of the image sensing apparatus.

Further, if the mode signal indicates the still image mode (logical value 1 in FIG. 9), K is set to an appropriate value between $k_1$ ($k_1 > k_0$) and 1 depending upon the performance of the image sensing apparatus regardless of the judged result (logical value 1 or 0).

Note, the operation shown in FIG. 9 can be realized by using logic gates or by using a table as shown in FIG. 9.

According to the above operation, it is possible for the image sensing apparatus to perform appropriate vibration blur correction depending upon cases of sensing a moving image or a still image, and cases where operation such as panning and tilting is performed or not.

Second Embodiment

Figure 5:
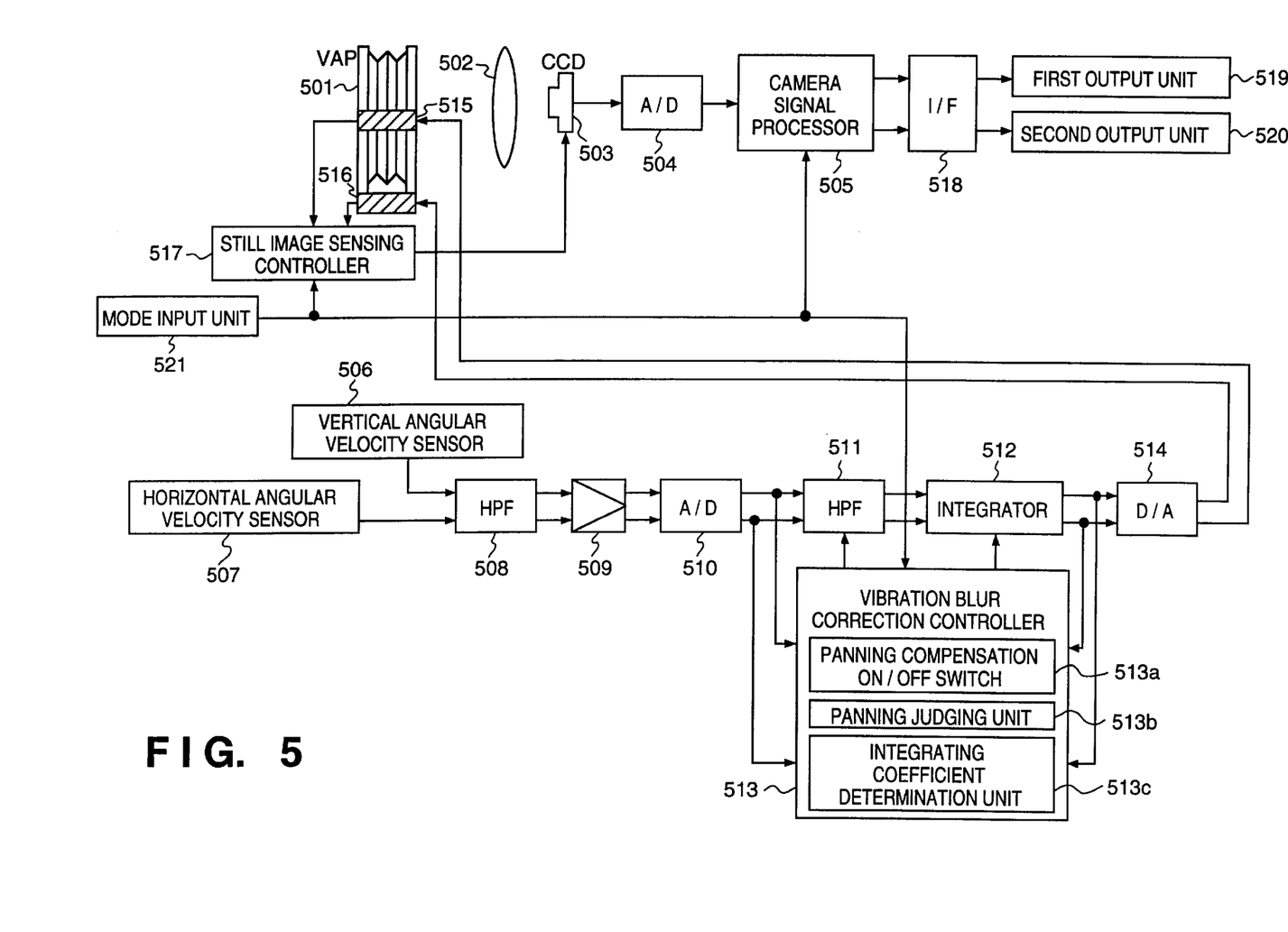
FIG. 5 is a block diagram illustrating a configuration of an image sensing apparatus according to a second embodiment of the present invention.

FIG. 5 is a block diagram illustrating a configuration of an image sensing apparatus according to a second embodiment of the present invention. In FIG. 5, reference numeral 501 denotes a light-path shifting unit, such as a variable apical angle prism (VAP); 502, an optical system; 503, a non-interlace scanning type CCD whose surface is covered with a complementary color mosaic filter; 504, a first A/D converter; 505, a camera signal processor; 506, a vertical angular velocity sensor comprising an angular velocity sensor, such as a vibration-type gyro; 507, a horizontal angular velocity sensor comprising an angular velocity sensor, such as a vibration-type gyro; 508, a high-pass filter (HPF); 509, an amplifier; 510, a second A/D converter; 511, a high-pass filter (HPF) whose cut-off frequency can be varied; 512, an integrator; 513, a vibration blur correction controller; 513a, a panning compensation ON/OFF switch; 513b, a panning judging unit; 513c, an integrating coefficient processing unit; 514, a D/A converter; 515, a horizontal VAP controller for driving the VAP and sensing the apical angle of the VAP 501 in the horizontal direction; 516, a vertical VAP controller for driving the VAP and sensing the apical angle of the VAP 501 in the vertical direction; 517, a still image sensing controller; 518, an interface (I/F); 519, a first output unit; 520 a second output unit; and 521, a mode input unit. The detail of the camera signal processor 505 will be explained later with reference to FIG. 6. Note, the second A/D converter 510, the HPF 511, the integrator 512, the vibration blur correction controller 513, and the D/A converter 514 can be realized by using a microcomputer. Note, acceleration sensor may replace the angular velocity sensors 506 and 507.

Next, an operation of the second embodiment will be explained below. Image signals are read out from the non-interlace scanning type CCD 503 at a rate of 60 frame/sec, converted into digital image signals by the first A/D converter 504, then inputted to the camera signal processor 505. The mode input unit 521 outputs a logical signal "Low" when a moving image mode is designated by an operator, and outputs a "High" signal when a still image mode is designated. The outputted logical signal enters the still image sensing controller 517, the camera signal processor 505, and the vibration blur correction controller 513. The camera signal processor 505 performs predetermined processes in accordance with the logical signals representing an image sensing mode, i.e., the moving image mode or the still image mode, and generates a luminance signal and a color difference signal. A sequence of generation of these signals will be explained later in detail with reference to FIG. 6.

The luminance and color difference signals are converted into NTSC standard video signals or signals of a data format for still image processing media in the I/F 518. Then, the NTSC standard video signals are outputted from the first output unit 519, and image signals for still image processing media are outputted from the second output unit 520. The horizontal and vertical angular velocity sensors 506 and 507 detect angular velocities of the image sensing apparatus in the horizontal and vertical directions. Thereafter, direct current components are removed from the angular velocity signals by the first HPF 508, and signal components caused by vibration are amplified to a preferred level by the amplifier 509. Then, the amplified signals are converted into digital signals by the second A/D converter 510, frequency components in a predetermined frequency range are extracted by the HPF 511 whose cut-off frequency can be changed, and the signals are converted into a signal representing angular displacement (referred as "angular displacement signal", hereinafter) by the integrator 512. The angular displacement signal is converted into an analog angular displacement signal by the D/A converter 514 and transmitted to the horizontal and vertical VAP controllers 515 and 516. Each of the horizontal and vertical VAP controllers 515 and 516 performs correction optically for canceling the vibration blurs by shifting the light path of the VAP 501 in accordance with the angular displacement signal.

Figure 10:
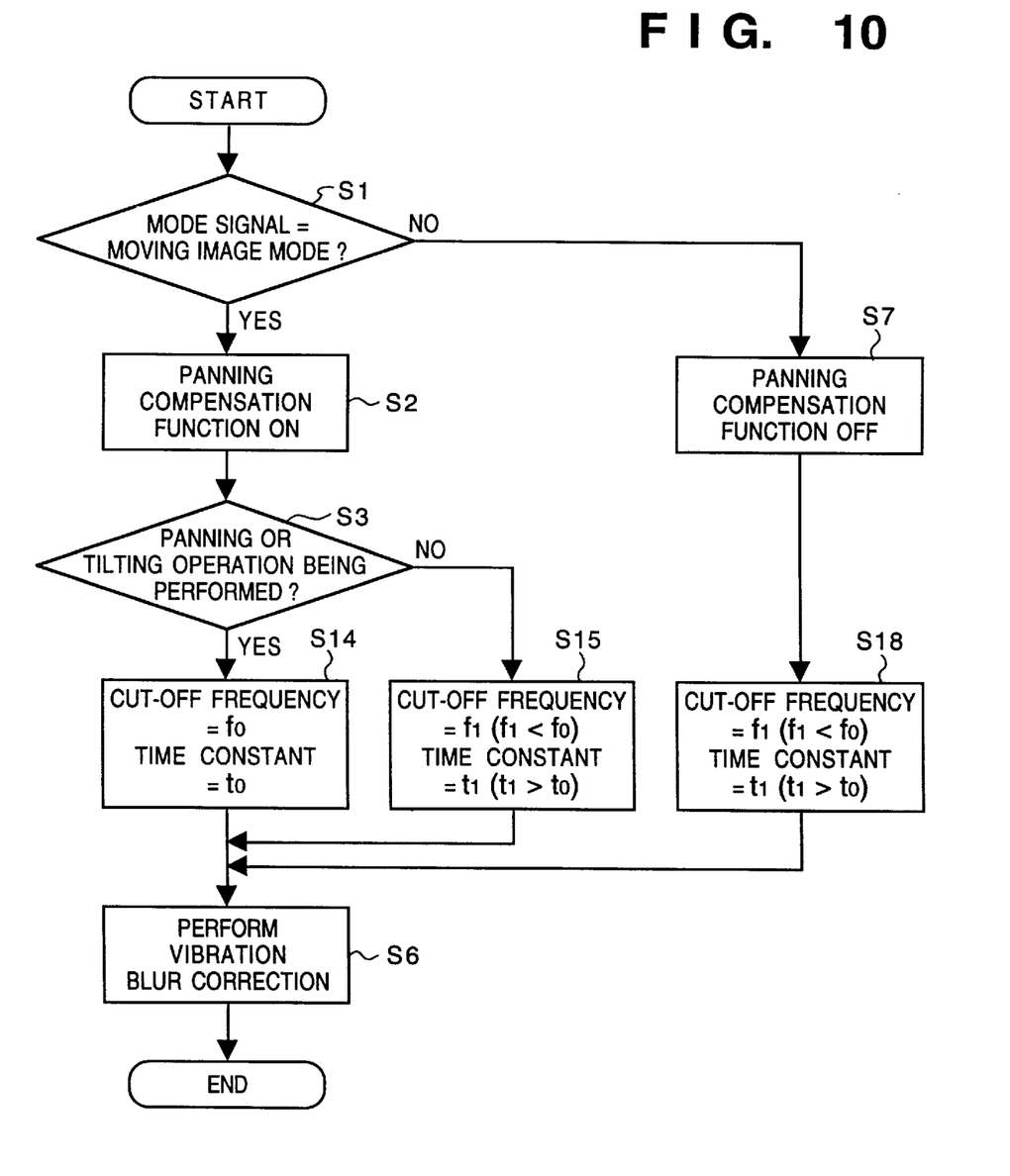
FIG. 10 is a flowchart showing a processing sequence performed by a blur correction controller shown in FIG. 5 according to the second embodiment of the present invention.

Next, the control of the vibration blur correction is explained with reference to a flowchart in FIG. 10.

If the logical signal Low, i.e., in the moving image mode (YES at step S1 in FIG. 10), then the panning compensation ON/OFF switch 513a of the vibration blur correction controller 513 is turned ON to perform panning compensation (step S2). First, the panning judging unit 513b judges whether an operation, such as panning and tilting, is performed or not on the basis of the angular displacement signal. The panning judging unit 513b judges that an operation, such as panning and tilting, is being performed in a case where the angular velocity and angular displacement represented by the angular velocity signal and the angular displacement signal are substantially constant for a predetermined period of time. If it is determined that panning or tilting is being performed (YES at step S3), the integrating coefficient determination unit 513c increases the cut-off frequency ($f_0$) of the HPF 511 and decreases a time constant ($t_0$) for integration by the integrator 512, thereby lowering the effect of the integration (step S14). If the panning judging unit 513b judges that panning or tilting is not being performed (NO at step S3), the cut-off frequency and the time constant are set to appropriate values, $f_1$ and $t_1$,($f_1 < f_0$, $t_1 > t_0$) respectively, depending upon the performance of the image sensing apparatus (step S15).

Further, if the logical signal is High, i.e., in the still image mode, (NO at step S1), then the panning compensation ON/OFF switch 513a is turned OFF (step S7), and the cut-off frequency and the time constant are set to appropriate values, $f_1$ and $t_1$,($f_1 < f_0$, $t_1 > t_0$) respectively, depending upon the performance of the image sensing apparatus (step S18).

Figure 11:
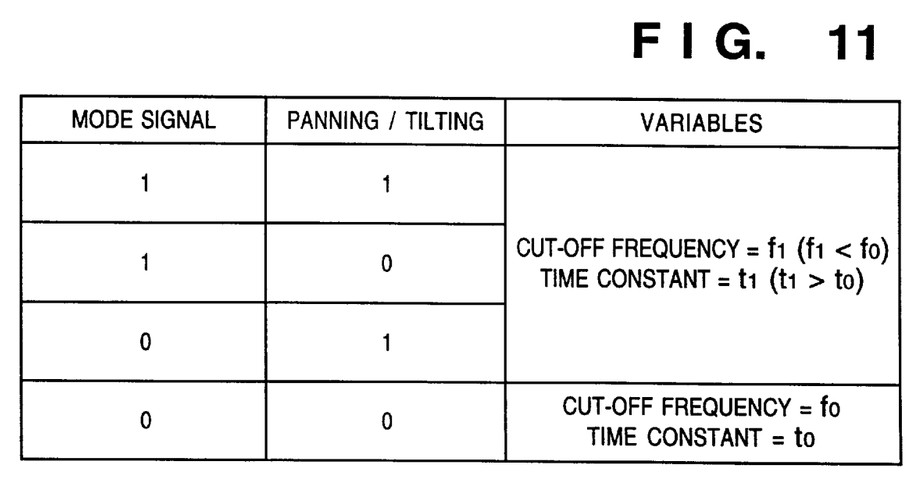
FIG. 11 is a table for explaining a part of another operation performed by the blur correction controller shown in FIG. 5 according to the second embodiment.

The vibration blur correction controller 513 may be configured so as to always judge whether an operation, such as panning and tilting, is being performed (logical value 0 in FIG. 9) or not (logical value 1 in FIG. 9). In this case, the vibration blur correction controller 513 does not need the panning compensation ON/OFF switch 513a in FIG. 5, and the integrating coefficient determination unit 513c determines the cut-off frequency of the HPF 511 and a time constant for integration by the integrator 512 in accordance with the table shown in FIG. 11.

Further, the horizontal and vertical VAP controller 515 and 516 detect the position of the apex of the VAP 501, and a signal representing the position of the apex is transmitted to the still image sensing controller 517. Then, a still image is sensed in the still image mode only when the apical angle of the VAP 501 is less than a predetermined angle, and processed. Accordingly, it is possible to prevent color separation of an image due to chromatic aberration of the VAP 501 as well as obtain a high-precision still image which is effectively processed with vibration blur correction.

Figure 6:
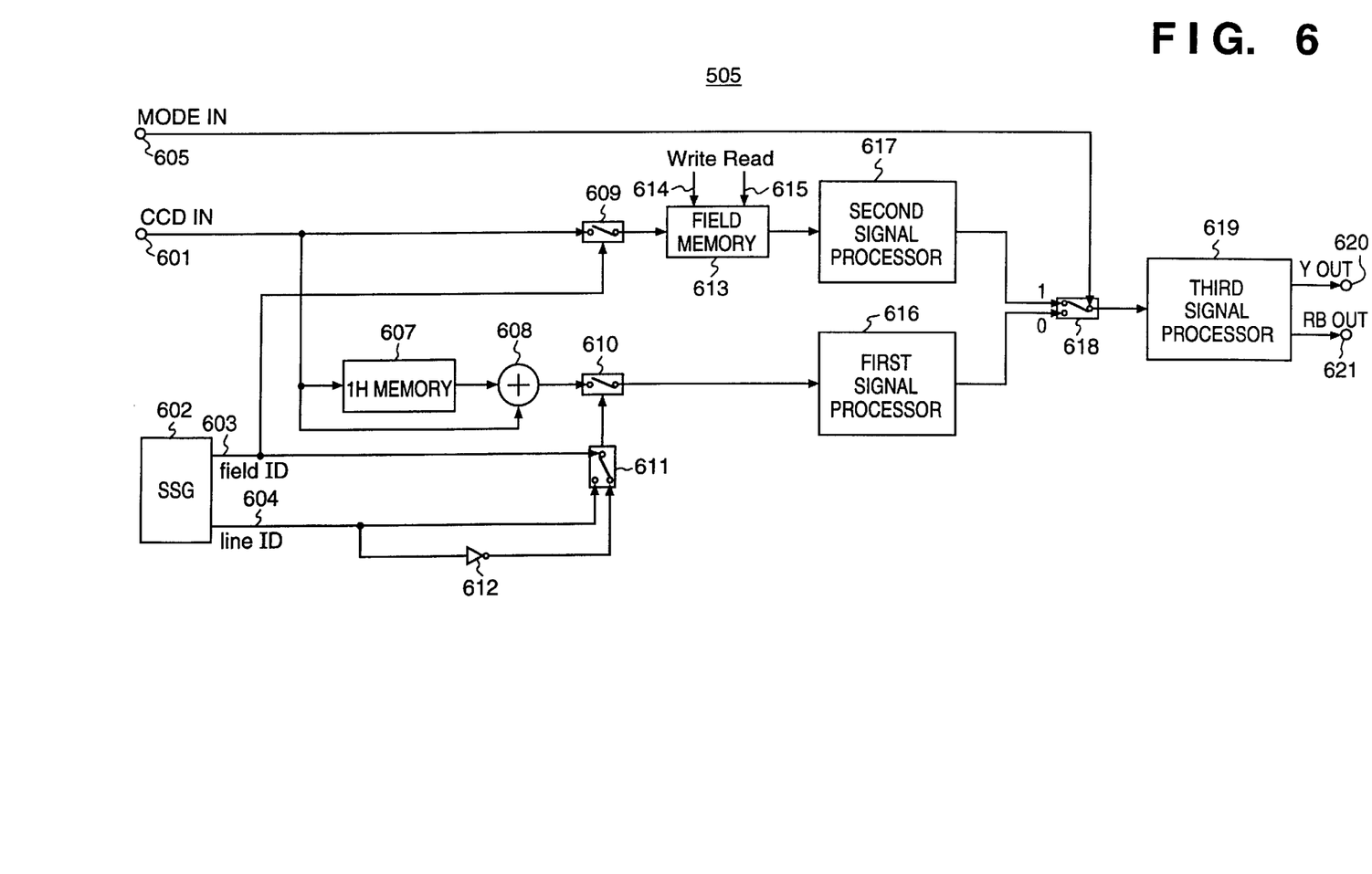
FIG. 6 is a block diagram illustrating a configuration of a camera signal processor shown in FIG. 5.
Figure 7:
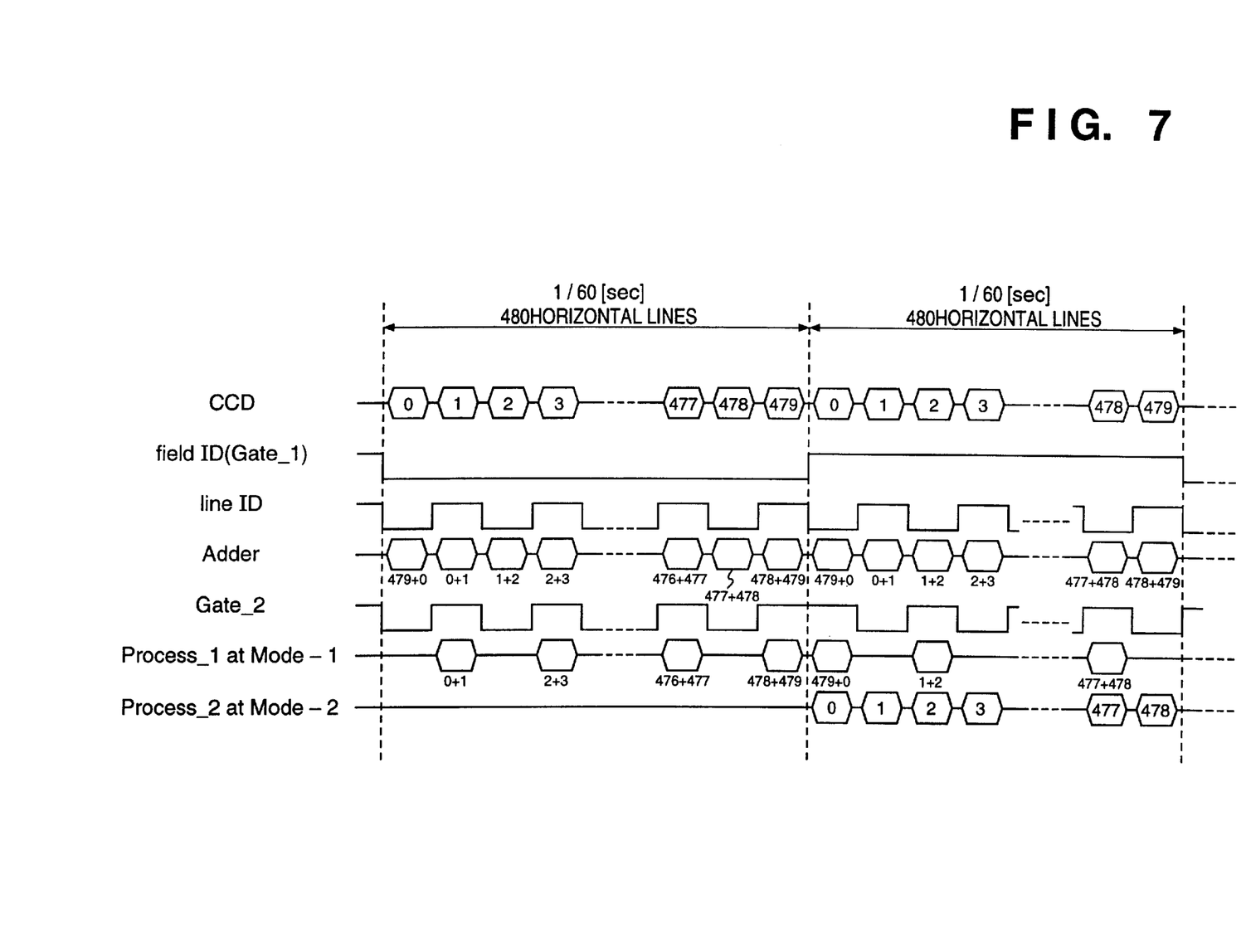
FIG. 7 is a timing chart showing an operation according to the second embodiment of the present invention.

Next, the camera signal processor 505 will be explained with reference to FIG. 6. In FIG. 6, reference numeral 601 denotes an input terminal for image signals outputted from the CCD 503; 602, a synchronizing signal generator (SSG); 603, a field ID signal; 604, an line ID signal; 605, an input terminal for a mode signal; 607, a one horizontal line (1H) memory; 608, an adder; 609, a first gate; 610, a second gate; 611, a first switch; 612, an inverter; 613, a field memory; 614, a write control signal; 615, a read control signal; 616, a first signal processor; 617, a second signal processor; 618, a second switch; 619, a third signal processor; 620, an output terminal of a luminance signal; and 621, an output terminal of a color difference signal. Further, FIG. 7 is a time chart showing operations of each unit of the camera signal processor 505 shown in FIG. 6.

Next, an operation of the camera signal processor 505 will be explained.

Image signals outputted from the CCD 503 are inputted via the input terminal 601 and added to a digital image signals of the previous horizontal line outputted from the 1H memory 607 by the adder 608 ("Adder" in FIG. 7), then sent to the second gate 610. The SSG 602 outputs the field ID signal 603 and the line ID signal 604 which are as shown in the time chart in FIG. 7. As shown in FIG. 7, the field ID signal 603 switches 0→1→0→1 . . . every field, and the line ID signal 604 switches 0→1→0→1 . . . every line. The second gate 610 is controlled by either the line ID signal 604 or its inverted signal inverted by the inverter 612. The line ID signal 604 or its inverted signal is selected by the first switch 611 which operates in accordance with the field ID signal 603. The second gate 610 operates as Gate_2 shown in the time chart in FIG. 7. Therefore, the output from the non-interlace scanning type CCD 503 which is transmitted to the first signal processor 616 is as shown by Process_1 at Mode-1 in FIG. 7. Namely, the obtained image signals corresponds to image signals obtained from a pixel addition scanning type CCD.

Meanwhile, digital image signals outputted from the A/D converter 504 are also transmitted to the first gate 609. Since the first gate 609 is controlled by the field ID signal 603, if the first gate 609 opens in a given field period (1/60 sec), then it closes in the next field period and transmits the signals to the field memory 613 as shown by Gate_1 in FIG. 7. The resultant output from the first gate 609 is, therefore, as Process_2 at Mode-2 shown in FIG. 7. In the field memory 613, writing and reading operation to/from the field memory 613 are performed in parallel in accordance with the write control signal 614 and the read control signal 615, in other words, image signals of a frame image outputted from the CCD 503 are buffered by the field memory 613. Note, in order to buffer the frame image signals in the field memory, the frequency of the write control signal 614 is set two times higher than the frequency of the read control signal 615. Thereafter, the image signals are transmitted to the second signal processor 617.

In the aforesaid manner, signals corresponding to two interlaced fields, i.e., signals corresponding to a frame, are outputted to the second signal processor 617. Each of the first signal processor 616 and the second signal processor 617 performs processes which have to be performed in consideration of correlated distance in the vertical direction, such as color separation and vertical edge correction. This is because signals inputted to the first signal processor 616 are interlaced signals corresponding to pixel addition scanning and signals inputted to the second signal processor 617 are non-interlaced signals corresponding to non-pixel addition scanning, therefore the correlated distances of these signals in the vertical direction differ from each other. In addition, since color information for each pixel differs between the interlaced signals and the non-interlaced signals, each of the signal processors 616 and 617 includes a matrix operation circuit for color reproduction.

When sensing an image in the moving image mode, the logical signal inputted via the input terminal 605 is Low. Accordingly, the second switch 618 connects to the side 0, and interlaced image signals which correspond to pixel addition scanning are transmitted to the third signal processor 619. Further, in a case of sensing an image in the still image mode, the logical signal inputted via the input terminal 605 is High. Accordingly, the second switch 618 connects to the side 1, and non-interlaced image signals which correspond to non-pixel addition scanning are transmitted to the third signal processor 619. The third signal processor 619 performs processes, such as γ correction, white balance correction, and clamping, which can be performed in common for the moving image mode and the still image mode. Then, a luminance signal Y is outputted from the output terminal 620 and a color difference signal RB is outputted from the output terminal 621.

According to the present invention as described above, when an operator wants to sense a normal moving image, various TV standard video signals can be obtained and displayed on a monitor conforming to the standard, and when the operator wants to sense a still image in order to output an obtained image to media other than devices conforming to TV standard video signals, image signals conforming to the media are automatically obtained. As a result, it is possible to realize an image sensing apparatus corresponding to both of a moving image and a still image of high quality.

Further, according to the present invention, when sensing a moving image, it is possible to perform vibration blur correction suitable for moving image sensing operation depending upon whether an operation, such as panning and tilting, is being performed or not by performing panning compensation, and when sensing a still image, effective vibration blur correction can be performed.

Furthermore, in a case of using a variable apical angle prism for correcting vibration blurs, color separation of an image due to chromatic aberration of the prism can be prevented.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:

an image sensing device which sequentially outputs non-interlaced image signals of all pixels;

mode designation means for designating either a moving image mode in which image signals for a moving image are generated from the non-interlaced image signals or a still image mode in which image signals for a still image are generated from the non-interlaced image signals;

judging means for judging whether or not said image sensing apparatus is making a predetermined movement while sensing an image by said image sensing device;

correction means for performing vibration blur correction whose correction degree can be changed; and setting means for setting the correction degree of the vibration blur correction to be performed by said correction means on the basis of the mode designated by said mode designation means and a judged result by said judging means.

2. The image sensing apparatus according to claim 1, wherein, if the moving image mode is designated by said mode designation means and if it is judged by said judging means that said image sensing apparatus is making the predetermined movement, said setting means sets the correction degree to a degree at which the vibration blur correction is not performed or to a degree which is lower than a degree set when the still image mode is designated, or a degree lower than when the moving image mode is designated and it is judged that said image sensing apparatus is making the predetermined movement.

3. The image sensing apparatus according to claim 2 further comprising signal processing means for obtaining magnitude and direction of a movement signal of an image on the basis of the image signals.

4. The image sensing apparatus according to claim 3, wherein said correction means corrects vibration blurs by operating the movement signal, and wherein, if the moving image mode is designated by said mode designation means and if it is judged by said judging means that said image sensing apparatus is making the predetermined movement, said setting means sets the correction degree by setting a constant to be used in the operation to 0 or a value which is smaller than a value to be set when the still image mode is designated, or a value smaller than when the moving image mode is designated and it is judged that said image sensing apparatus is not making the predetermined movement.

5. The image sensing apparatus according to claim 3, wherein the predetermined movement is panning, tilting, and combination thereof, and said judging means judges that said image sensing apparatus is making the predetermined movement in a case where the magnitude and direction of several consecutive movement signals are substantially same for a predetermined period of time.

6. The image sensing apparatus according to claim 2, wherein said correction means includes angular velocity detection means for detecting an angular velocity of said image sensing apparatus and angular displacement detection means for obtaining an angular displacement on the basis of the angular velocity detected by said angular velocity detection means.

7. The image sensing apparatus according to claim 6, wherein said angular displacement detection means includes a high-pass filter whose cut-off frequency can be changed and an integrator whose time constant can be changed, and wherein, if the moving image mode is designated by said mode designation means and if it is judged by said judging means that said image sensing apparatus is making the predetermined movement, said setting means sets the correction degree by setting the cut-off frequency of said high-pass filter to a frequency which is higher than a frequency to be set when the still image mode is designated, or a frequency higher than when the moving image mode is designated and it is judged that said image sensing apparatus is not making the predetermined movement and by setting the time constant of said integrator to 0 or a value which is smaller than a value to be set when the still image mode is designated, or a value smaller than when the moving image mode is designated and it is judged that said image sensing apparatus is not making the predetermined movement.

8. The image sensing apparatus according to claim 6, wherein the predetermined movement is panning, tilting, and combination thereof, and said judging means judges that said image sensing apparatus is making the predetermined movement in a case where the angular velocity and the angular displacement are substantially constant for a predetermined period of time.

9. The image sensing apparatus according to claim 1, wherein said correction means includes a variable apical angle prism and apical angle changing means for changing the apical angle of said variable apical angle prism, and corrects vibration blurs by changing the apical angle of said variable apical angle prism.

10. The image sensing apparatus according to claim 9 further comprising measuring means for measuring the apical angle of said variable apical angle prism, wherein, in a case where the still image mode is designated by said mode designation means, an image sensing operation is performed when the apical angle measured by said measuring means is smaller than a predetermined value.

11. The image sensing apparatus according to claim 1, wherein the image signals for the moving image is of NTSC standard.

12. The image sensing apparatus according to claim 1, wherein the image signals for the moving image is of PAL standard.

13. An control method for an image sensing apparatus comprising:

an image sensing step of sequentially outputting non-interlaced image signals of all pixels of an image sensing device;

a mode designation step of designating either a moving image mode in which image signals for a moving image are generated from the non-interlaced image signals or a still image mode in which image signals for a still image are generated from the non-interlaced image signals;

a judging step of judging whether or not the image sensing apparatus is making a predetermined movement while sensing an image at said image sensing step;

a setting step of setting correction degree of vibration blur correction on the basis of the mode designated at said mode designation step and a judged result obtained at said judging step; and a correction step of performing vibration blur correction on the basis of the correction degree set at set setting step.

14. The control method according to claim 13, wherein, if the moving image mode is designated at said mode designation step and if it is judged at said judging step that the image sensing apparatus is making the predetermined movement, at said setting step, the correction degree is set to a degree at which the vibration blur correction is not performed or to a degree which is lower than a degree set when the still image mode is designated, or a degree lower than when the moving image mode is designated and it is judged that the image sensing apparatus is making the predetermined movement.

15. The control method according to claim 14 further comprising a signal processing step of obtaining magnitude and direction of a movement signal of an image on the basis of the image signals obtained at said image sensing step.

16. The control method according to claim 15, wherein at said correction step, the movement signal is operated to correct vibration blurs, and wherein, if the moving image mode is designated at said mode designation step and if it is judged at said judging step that the image sensing apparatus is making the predetermined movement, at said setting step, a constant to be used in the operation is set to 0 or a value which is smaller than a value to be set when the still image mode is designated, or a value smaller than when the moving image mode is designated and it is judged that the image sensing apparatus is not making the predetermined movement, to set the correction degree.

17. The control method according to claim 15, wherein the predetermined movement is panning, tilting, and combination thereof, and at said judging step, it is judged that the image sensing apparatus is making the predetermined movement in a case where the magnitude and direction of several consecutive movement signals are substantially constant for a predetermined period of time.

18. The control method according to claim 14, wherein said correction step includes an angular velocity sensing step of detecting an angular velocity of the image sensing apparatus and an angular displacement detection step of obtaining an angular displacement on the basis of the angular velocity detected at said angular velocity sensing step.

19. The control method according to claim 18, wherein, at said angular displacement detection step, a high-pass filter whose cut-off frequency can be changed and an integrator whose time constant can be changed are used to detect the angular displacement, and wherein, if the moving image mode is designated at said mode designation step and if it is judged at said judging step that the image sensing apparatus is making the predetermined movement, at said setting step, the cut-off frequency of said high-pass filter is set to a frequency which is higher than a frequency to be set when the still image mode is designated, or a frequency higher than when the moving image mode is designated and it is judged that the image sensing apparatus is not making the predetermined movement and the time constant of said integrator is set to 0 or a value which is smaller than a value to be set when the still image mode is designated, or a value smaller than when the moving image mode is designated and it is judged that the image sensing apparatus is not making the predetermined movement, to set the correction degrees 20. The control method according to claim 18, wherein the predetermined movement is panning, tilting, and combination thereof, and at said judging step, it is judged that the image sensing apparatus is making the predetermined movement in a case where the angular velocity and the angular displacement are substantially constant for a predetermined period of time.

21. The control method according to claim 13, wherein at said correction step, vibration blurs are corrected by changing the apical angle of a variable apical angle prism provided in said image sensing apparatus.

22. The control method according to claim 21 further comprising a measuring step of measuring the apical angle of the variable apical angle prism, wherein, in a case where the still image mode is designated at said mode designation step, an image sensing operation is performed when the apical angle measured at said measuring step is smaller than a predetermined value.

23. The control method according to claim 13, wherein the image signals for the moving image is of NTSC standard.

24. The control method according to claim 13, wherein the image signals for the moving image is of PAL standard.

* * * * *